United States Patent [19]

Amiet

[11] Patent Number: 5,125,288
[45] Date of Patent: Jun. 30, 1992

[54] ARCUATE BICYCLE CRANK LEVER APPARATUS

[76] Inventor: Alick G. Amiet, 195 Waterloo Street Cleveland 4163, Queensland, Australia

[21] Appl. No.: 644,277

[22] Filed: Jan. 22, 1991

[51] Int. Cl.⁵ .............................................. G05G 1/14
[52] U.S. Cl. ............................. 74/594.1; 74/594.3; 74/594.5; 280/291
[58] Field of Search ............... 74/594.1, 594.3, 594.4, 74/594.5, 594.7; 280/212, 291

[56] References Cited

U.S. PATENT DOCUMENTS

| | | | |
|---|---|---|---|
| 359,609 | 3/1887 | Jeffery | 74/594.1 |
| 518,456 | 4/1894 | Ide | 74/594.1 |
| 612,790 | 10/1898 | Tanner | 74/594.1 X |
| 2,277,748 | 3/1942 | Duffy | 74/594.1 X |
| 4,009,623 | 2/1977 | Smith et al. | 74/594.1 X |
| 4,077,648 | 3/1978 | Seul | 74/594.1 X |
| 4,446,753 | 5/1984 | Nagano | 74/594.1 |
| 4,606,241 | 8/1986 | Fredriksson | 74/594.1 |

FOREIGN PATENT DOCUMENTS

| | | | |
|---|---|---|---|
| 0081990 | 12/1894 | Fed. Rep. of Germany | 74/594.3 |
| 0590819 | 6/1925 | France | 74/594.1 |
| 0976018 | 3/1951 | France | 74/594.1 |
| 2566361 | 12/1985 | France | 74/594.1 |
| 0427737 | 11/1947 | Italy | 74/594.1 |
| 0009796 | 4/1890 | United Kingdom | 74/594.3 |
| 0405998 | 2/1934 | United Kingdom | 74/594.3 |

*Primary Examiner*—Leslie A. Braun
*Assistant Examiner*—Winnie Yip
*Attorney, Agent, or Firm*—Leon Gilden

[57] ABSTRACT

An apparatus wherein diametrically opposed crank lever members are mounted to a central sprocket pin whose arc is defined by a first diameter substantially equal to one-half of a spacing between opposed ends of each crank lever to enhance application of force to the central pin involving inherent flexure and alignment of the terminal ends of each crank lever, with force factors directed at the opposed terminal ends by the pedal assemblies. A modification of the invention includes each crank lever formed with a coextensive, hollow chamber directed between opposed terminal ends of each crank lever, including a mercury column defined by a length less than the chamber length to enhance inertial application of the mercury fluid during initial rotation of the pedals in use.

1 Claim, 3 Drawing Sheets

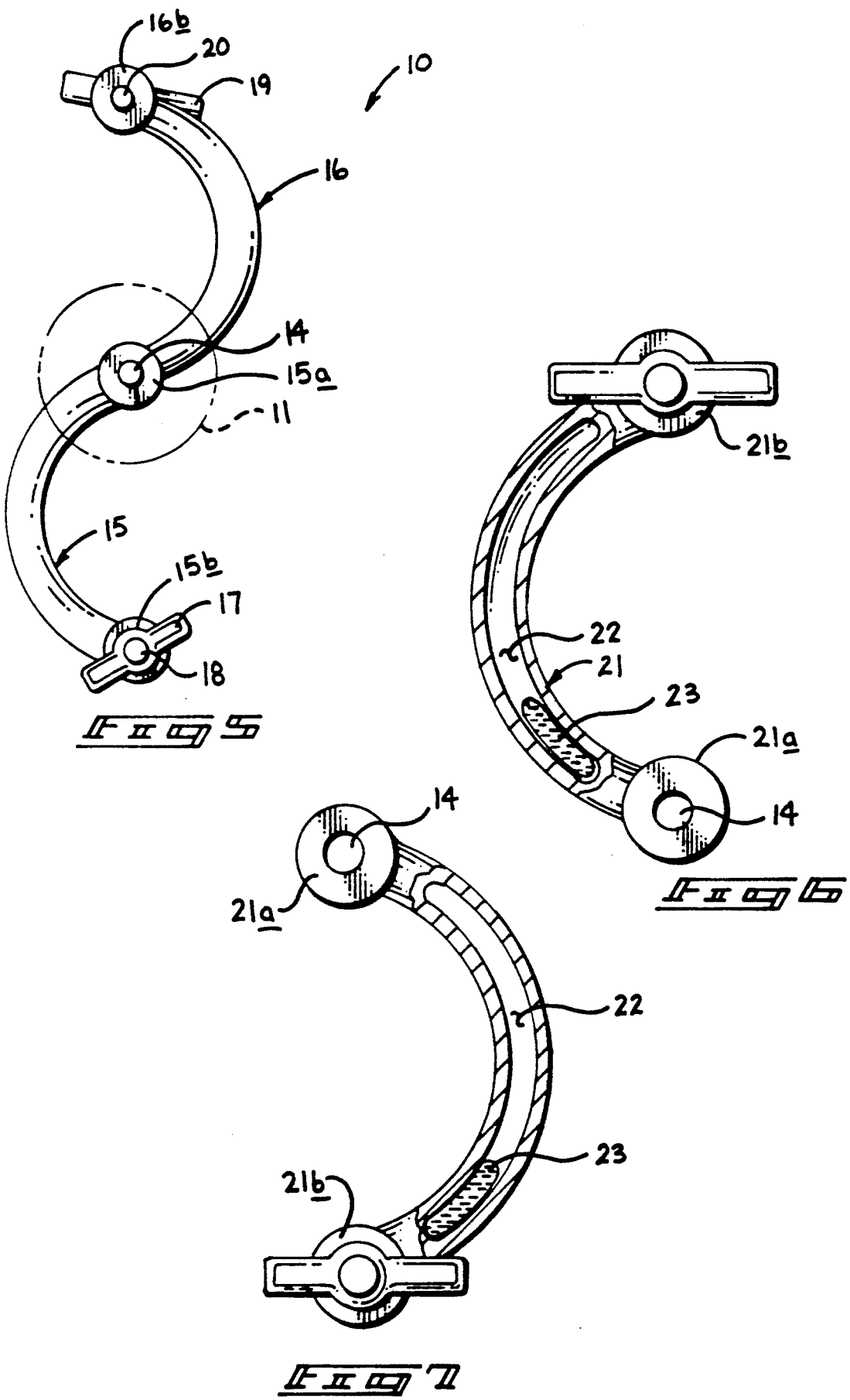

ARCUATE BICYLE CRANK LEVER APPARATUS

BACKGROUND OF THE INVENTION

1. Field of the Invention

The field of invention relates to bicycle crank lever organizations, and more particularly pertains to a new and improved arcuate bicycle crank lever apparatus wherein the same utilizes semi-circular crank levers arranged in mirror image relationship diametrically aligned relative to a central crank pin to enhance ease of rotation and application of force to the central crank pin.

2. Description of the Prior Art

Various crank pin apparatus has been utilized in the prior art to translate rotary motion utilizing mechanical advantage of an extended lever relative to a central crank pin. Typically, the crank pin levers have been of a linear configuration, as exemplified in U.S. Pat. No. 2,277,748 to Duffy for example, as well as U.S. Pat. No. 4,446,753 to Nagano.

U.S. Pat. No. 4,606,241 to Fredricksson sets forth an adjustable crank pin assembly wherein the relatively "L" shaped crank levers are provided, wherein each one of the levers is adjustably mounted relative to a single pin.

U.S. Pat. No. 4,077,648 to Seul sets forth a bicycle upholstery propulsion means utilizing lever means pivotally mounted relative to a rear sprocket, whereupon reciprocation of the lever relative a rear sprocket translates such power to a drive sprocket as a novel compulsion means for a bicycle.

As such, it may be appreciated that there continues to be a need for a new and improved arcuate bicycle crank lever apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of bicycle crank member apparatus now present in the prior art, the present invention provides an arcuate bicycle crank lever apparatus wherein the same utilizes semi-circular arcuate crank levers arranged in diametrically opposed relationship relative to a central crank pin, wherein the arcuate levers include a structural component in alignment with force vectors directed to the levers to accommodate application of force limiting flexure of the crank member assemblies limiting their requisite weight requirements and their construction relative to the bicycle organization. As such, the general purpose of the present invention, which will be described subsequently in greater detail, is to provide a new and improved arcuate bicycle crank lever apparatus which has all the advantages of the prior art crank lever organizations and none of the disadvantages.

To attain this, the present invention provides an apparatus wherein diametrically opposed crank lever members are mounted to a central sprocket pin whose arc is defined by a first diameter substantially equal to one-half of a spacing between opposed ends of each crank lever to enhance application of force to the central pin involving inherent application of force to the central pin involving inherent flexure and alignment of the terminal ends of each crank lever, with force factors directed at the opposed terminal ends by the pedal assemblies. A modification of the invention includes each crank lever formed with a coextensive, hollow chamber directed between opposed terminal ends of each crank lever, including a mercury column defined by a length less than the chamber length to enhance inertial application of the mercury fluid during initial rotation of the pedals in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved arcuate crank lever apparatus which has all the advantages of the prior art crank lever organizations and none of the disadvantages.

It is another object of the present invention to provide a new and improved arcuate crank lever apparatus which may be easily and efficiently manufactured and marketed.

It is a further object of the present invention to provide a new and improved arcuate bicycle crank lever apparatus which is of a durable and reliable construction.

An even further object of the present invention is to provide a new and improved arcuate bicycle crank lever apparatus which is susceptible of a low cost of manufacture with regard to both materials and labor, and which accordingly is then susceptible of low prices of sale to the consuming public, thereby making such arcuate bicycle crank lever apparatus economically available to the buying public.

Still yet another object of the present invention is to provide a new and improved arcuate bicycle crank lever apparatus which provides in the apparatuses and methods of the prior art some of the advantages thereof, while simultaneously overcoming some of the disadvantages normally associated therewith.

Still another object of the present invention is to provide a new and improved arcuate bicycle crank lever apparatus wherein the same provides for arcuate crank lever assemblies to accommodate force vectors directed thereto limiting flexure and allowing use of lighter fabrication of such lever construction in use in a bicycle assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic side view, taken in elevation, of diametrically opposed arcuate crank levers arranged in a mirror image relationship relative to a central crank pin.

FIG. 6 is an orthographic side view, taken in elevation, partially in cross-section, of a modified arcuate crank lever utilized by the instant invention.

FIG. 7 is an orthographic view of the modified crank member in a second lowered position from a first raised position, as illustrated in FIG. 6.

DESCRIPTION OF THE PREFERRED EMBODIMENT

Figure 1:
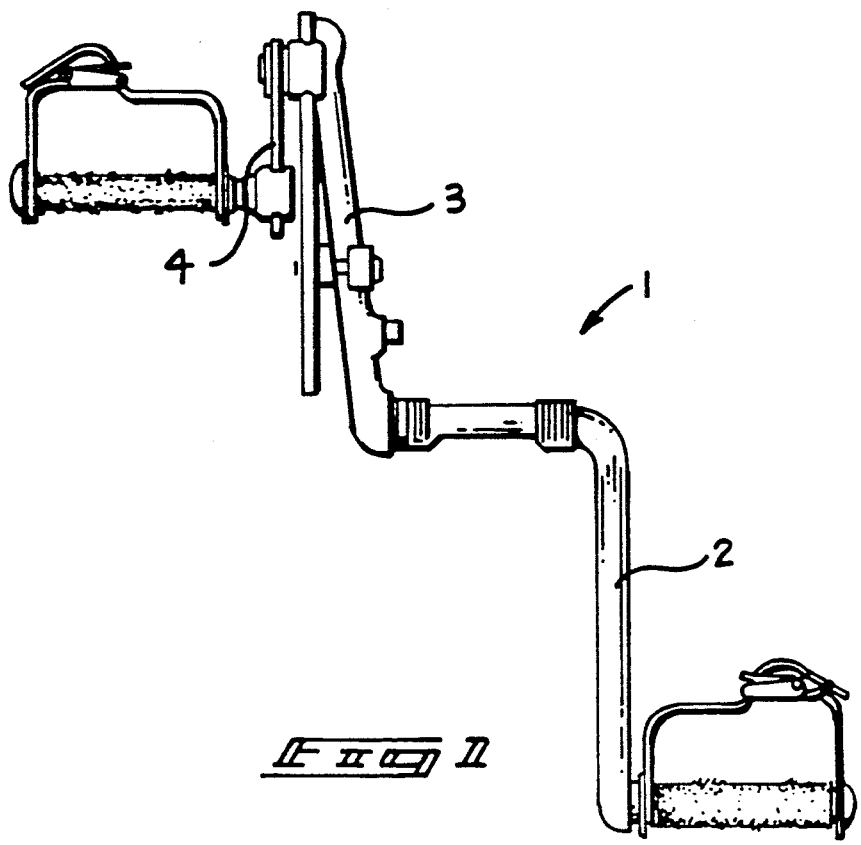
FIG. 1 is an orthographic side view, taken in elevation, of a prior art bicycle crank lever apparatus.

With reference now to the drawings, and in particular to FIGS. 1 to 7 thereof, a new and improved arcuate bicycle crank lever apparatus embodying the principles and concepts of the present invention and generally designated by the reference numeral 10 will be described.

Figure 2:
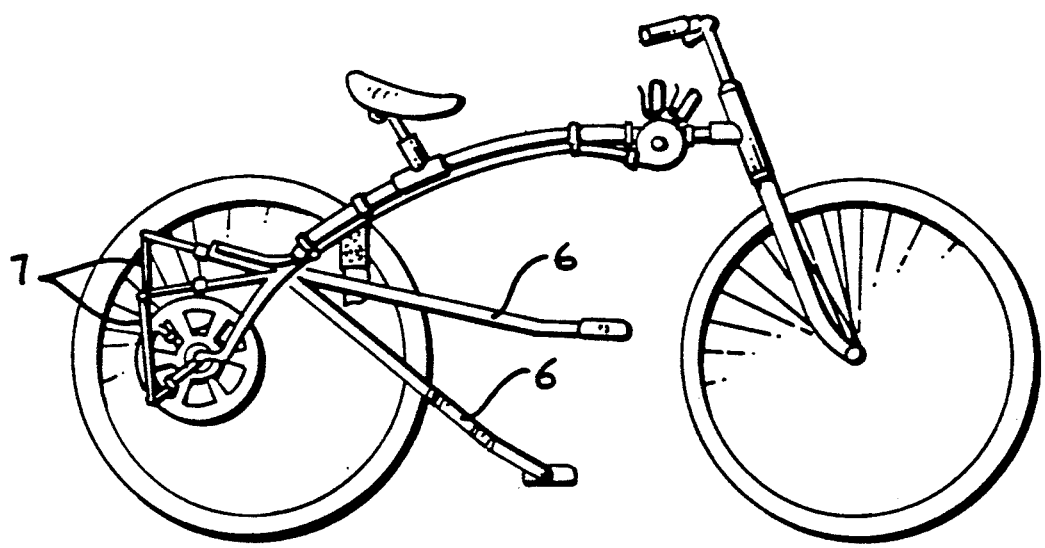
FIG. 2 is an orthographic side view, taken in elevation, of a further example of a bicycle lever actuator assembly.
Figure 3:
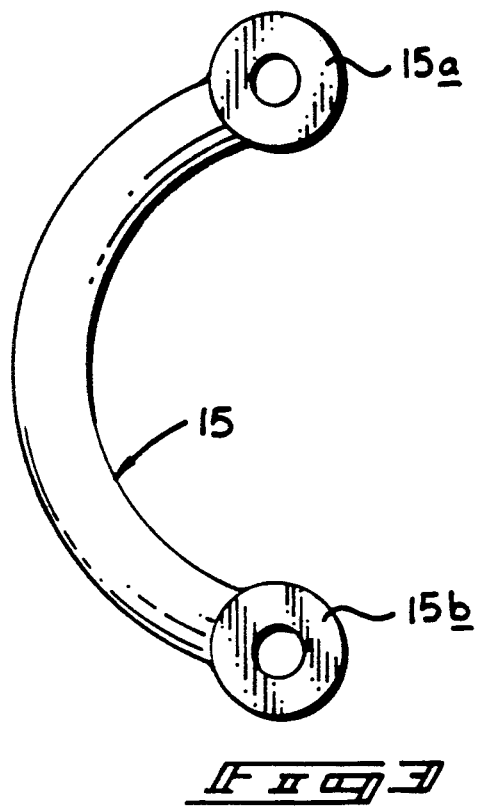
FIG. 3 is an orthographic side view, taken in elevation, of a crank lever utilized by the instant invention.
Figure 4:
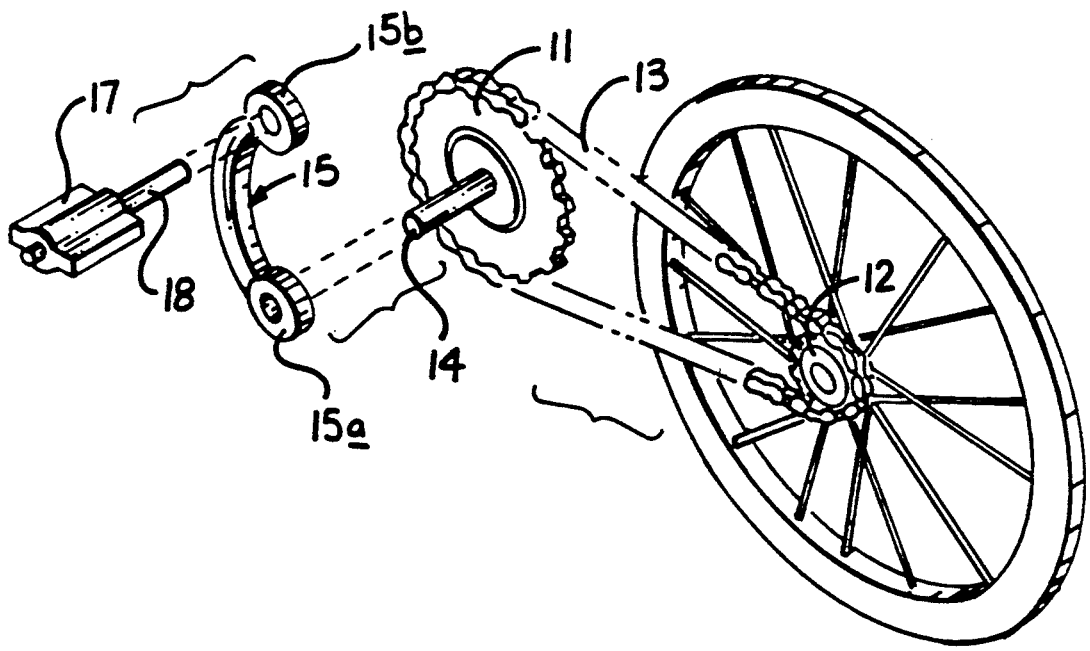
FIG. 4 is an isometric illustration of a single crank lever mounted to the crank pin of a conventional bicycle sprocket arrangement.

FIG. 1 illustrates a prior art crank lever organization utilized in a bicycle, wherein the organization 1 utilizes generally "L" shaped levers 2 and 3, wherein the lever assembly 3 includes an adjustment rod 4 to effect radial adjustment of the assembly relative to the support crank pin, in a manner as discussed in U.S. Pat. No. 4,606,241. FIG. 2 sets forth a novel pedal cycle organization, as set forth in U.S. Pat. No. 4,077,648, wherein the levers 6 are directed rearwardly of the framework utilizing actuator rods 7 directed to a drive sprocket to actuate a driven sprocket (not shown).

More specifically, the arcuate bicycle crank lever apparatus 10 of the instant invention essentially comprises a forward sprocket 11 (see FIG. 4) arranged to direct propulsion to a rear sprocket 12 through a continuous drive chain 13 in communication with forward and rear sprockets 11 and 12. A crank pin 14 is orthogonally and axially directed through the forward sprocket 11 mounting a first arcuate crank lever 15, as illustrated, in cooperation with a second arcuate crank lever 16 (see FIG. 5) that are mounted fixedly to the crank pin 14 in a diametrically opposed relationship. The first arcuate crank lever 15 includes a first crank pin end 15a mounting the first arcuate crank lever 15 to the crank pin 14 and a second pedal mounting end 15b mounting a first pedal assembly 17 rotatably thereto through a first pedal rod 18. Similarly, the second arcuate crank lever 16 utilizes a like crank pin end mounting the second arcuate crank lever 16 to the crank pin 14, with a second pedal end 16b mounting a second pedal assembly 19 rotatably to the second end 16b through a second pedal rod 20. The first and second arcuate crank levers are of an arcuate configuration whose convex surface is directed in the rotative direction of the pedals to effect propulsion of an associated bicycle organization. Further, each crank lever is defined by a predetermined diameter D, wherein the opposed first and second crank lever second ends 16b and 15b are spaced apart a diametrical spacings substantially equal to twice that of the predetermined diameter of each arcuate crank lever 15 to provide a structural component of each crank lever to accommodate a force vector upon application of force to each crank lever during rotation of the crank levers and application of rotative force to the central crank pin 14.

FIGS. 6 and 7 illustrate the use of modified opposed arcuate crank levers 21 of identical configuration. For purpose of illustration, only one of the plurality of modified arcuate crank levers 21 will be illustrated, but it is understood that they are mounted in opposed relationship in a manner as illustrated in FIG. 5. Each modified lever 21 includes an arcuate hollow chamber 22 defined by a predetermined chamber length, including a liquid mercury column 23 contained therewithin, wherein the column is defined by a column height less than the chamber length, whereupon during initial rotative application of force, the column 23 is directed from a central axial position adjacent the first crank pin end 21a, whereupon forward directing of the pedal directs the column 23 towards the second end 21b to enhance application of force in use. As only the crank lever end in a raised position, such as the pedal 16 as illustrated in FIG. 5, receives such force, the column of a lower lever is permitted to return to its respective crank pin end or first end upon application of force to the top lever.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arcuate bicycle crank lever apparatus comprising, in combination,
   - a forward sprocket spaced from a rear sprocket, wherein the rear sprocket is in operative association with a bicycle wheel, and the forward and rear sprocket includes a continuous drive chain in communication therewith, and
   - a central crank pin orthogonally, integrally, and coaxially mounted relative to the forward sprocket extending laterally of each side of the forward sprocket, and
   - a first arcuate crank lever and a second arcuate crank lever mounted to the crank pin in a diametrically opposed relationship relative to the crank pin, and the first arcuate crank lever includes a first lever first end and a first lever second end, and the second arcuate crank lever includes a second lever first end and a second lever second end, wherein each first end is mounted fixedly to the crank pin and each second end includes a rotatable pedal assembly mounted thereto, and
   - wherein the first and second crank levers are defined by a predetermined diameter, and the first arcuate crank lever second end and the second arcuate crank lever second end are spaced apart a predetermined spacing, wherein the predetermined spacing is substantially twice the predetermined diameter of each first and second arcuate crank lever, and
   - wherein each arcuate crank lever defines a convex surface, and wherein each convex surface is oriented in rotative orientation of each crank lever about the crank pin, and
   - wherein each first and second arcuate crank lever includes an arcuate hollow chamber coextensively formed therethrough, with each chamber defining a chamber length, and each chamber including a liquid mercury column contained therewithin, and each liquid mercury column is defined by a column height less than the chamber length.

* * * * *